US008803986B2

(12) United States Patent
Sato

(10) Patent No.: US 8,803,986 B2
(45) Date of Patent: Aug. 12, 2014

(54) VIBRATION ACTUATOR, AND LENS BARREL AND CAMERA PROVIDED WITH THE VIBRATION ACTUATOR

(75) Inventor: Takahiro Sato, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/000,063

(22) PCT Filed: Jun. 22, 2009

(86) PCT No.: PCT/JP2009/061310
§ 371 (c)(1),
(2), (4) Date: Dec. 20, 2010

(87) PCT Pub. No.: WO2009/157405
PCT Pub. Date: Dec. 30, 2009

(65) Prior Publication Data

US 2011/0102610 A1 May 5, 2011

(30) Foreign Application Priority Data

Jun. 23, 2008 (JP) ................................ 2008-163080

(51) Int. Cl.
*H04N 5/228* (2006.01)

(52) U.S. Cl.
USPC ...................................................... 348/208.5

(58) Field of Classification Search
USPC ...................................................... 348/208.5
See application file for complete search history.

(56) References Cited

U.S. PATENT DOCUMENTS

2001/0022688 A1* 9/2001 Kosaka et al. ................ 359/557
2004/0255913 A1* 12/2004 Veinotte ........................ 123/520
2005/0168584 A1* 8/2005 Uenaka ................... 348/208.99
2007/0195438 A1 8/2007 Paik et al.

FOREIGN PATENT DOCUMENTS

JP S59-185180 10/1984
JP A-60-55866 4/1985
JP H02-123972 5/1990
JP A-2-266879 10/1990
JP A-5-344761 12/1993
JP A-2007-226234 9/2007

OTHER PUBLICATIONS

International Search Report issued in International Application No. PCT/JP2009/061310 on Sep. 1, 2009 (with translation).
Nov. 13, 2012 Office Action issued in Japanese Patent Application No. 2008-163080 (with translation).

* cited by examiner

*Primary Examiner* — Usman Khan
(74) *Attorney, Agent, or Firm* — Oliff PLC

(57) ABSTRACT

Provided is a vibration actuator having stable drive characteristics, and a lens barrel and a camera which are provided with such vibration actuator. The vibration actuator of the present invention is provided with: a relatively moving member, which is brought into pressurized contact with a vibrating member, and moves relative to the vibrating member by vibration of the vibrating member; a pressure member which brings the vibrating member and the relatively moving member into pressurized contact with each other; and a magnetic force generating section which adjusts the pressurizing force of the pressure member by a magnetic force.

9 Claims, 3 Drawing Sheets

1
2
6
3
5
4
10
A

VIBRATION ACTUATOR, AND LENS BARREL AND CAMERA PROVIDED WITH THE VIBRATION ACTUATOR

TECHNICAL FIELD

The present invention relates to a vibration actuator, and a lens barrel and a camera provided with the vibration actuator.

BACKGROUND ART

A vibration actuator includes a vibrating body. The vibrating body includes an elastic body and an electromechanical conversion element. The vibration actuator causes the electromechanical conversion element to extend and contract by way of a drive signal and uses this extension and contraction to generate a progressive vibration wave (hereinafter, referred to as progressive wave) on a driving face of the elastic body. This progressive wave causes an elliptical motion, thereby driving a relatively moving member in pressurized contact with the wave crests of the elliptical motion. In such a vibration actuator, the drive characteristics change under the high temperature or low temperature environment from a state at ordinary temperature.

Technology has been disclosed which provides a sensor electrode with a piezoelectric body (electromechanical conversion element) that configures the vibrating body and detects the temperature of the vibrating body, and performs temperature correction of a speed control of a moving body (the relatively moving member) in order to stabilize the drive characteristics with respect to the temperature of the. vibrating actuator (for example, refer to Patent Document 1).

Patent Document 1: Japanese Unexamined Patent Application, Publication No. H5-344761.

DISCLOSURE OF THE INVENTION

Problems To Be Solved By the Invention

However, the abovementioned prior art has a problem in that requires circuits and the like for detection and control, and thus the configuration thereof becomes complex, a result of which production cost is high.

It is an object of the present invention to provide a vibration actuator having stable drive characteristics, and a lens barrel and a camera equipped with such a vibration actuator in a simple configuration.

Means For Solving the Problems

The present invention achieves the object by way of the following means.

An invention described in claim 1 is a vibration actuator comprising: a relatively moving member which is brought into pressurized contact with a vibrating member and moves relative to the vibrating member by vibration of the vibrating member; a pressure member which brings the vibrating member and the relatively moving member into pressurized contact with each other; and a magnetic force generating unit which adjusts a pressurizing force of the pressure member by way of magnetic force.

An invention described in claim 2 is the vibration actuator according to claim 1, wherein the pressure member includes an elastic member that presses the vibrating member toward a side of the relatively moving member, and the magnetic force generating unit causes a magnetic force to be generated in a direction suppressing pressure imparted by the elastic member.

An invention described in claim 3 is the vibration actuator according to claim 2, wherein the magnetic force generating unit includes a magnetic material and a magnet, and the elastic member is disposed between the magnetic material and the magnet.

An invention described in claim 4 is the vibration actuator according to claim 3, wherein the magnet is a permanent magnet.

An invention described in claim 5 is the vibration actuator according to claim 3 or claim 4, wherein the magnetic material is disposed on one side of the magnet and the vibrating member is disposed on another side of the magnet.

An invention described in claim 6 is the vibration actuator according to claim 5, wherein the magnet is disposed on one side of the vibrating member and the relatively moving member is disposed on another side of the vibrating member.

An invention described in claim 7 is the vibration actuator according to any one of claims 1 to 6, wherein the vibrating member includes an electromechanical conversion element that converts electrical energy into mechanical energy and an elastic body that generates the vibration by excitation of the electromechanical conversion element, and the relatively moving member is disposed on one side of the elastic body and the electromechanical conversion element is disposed on another side of the elastic body.

An invention described in claim 8 is a lens barrel provided with the vibration actuator according to any one of claims 1 to 7.

An invention described in claim 9 is a camera provided with the vibration actuator according to any one of claims 1 to 7.

It should be noted that the abovementioned configuration may be modified as appropriate and may be at least partially replaced with another component.

Effects of the Invention

According to the present invention, it is possible to provide a vibration actuator having stable drive characteristics, and a lens barrel and a camera equipped with such a vibration actuator in a simple configuration.

EXPLANATION OF REFERENCE NUMERALS

Figure 1:
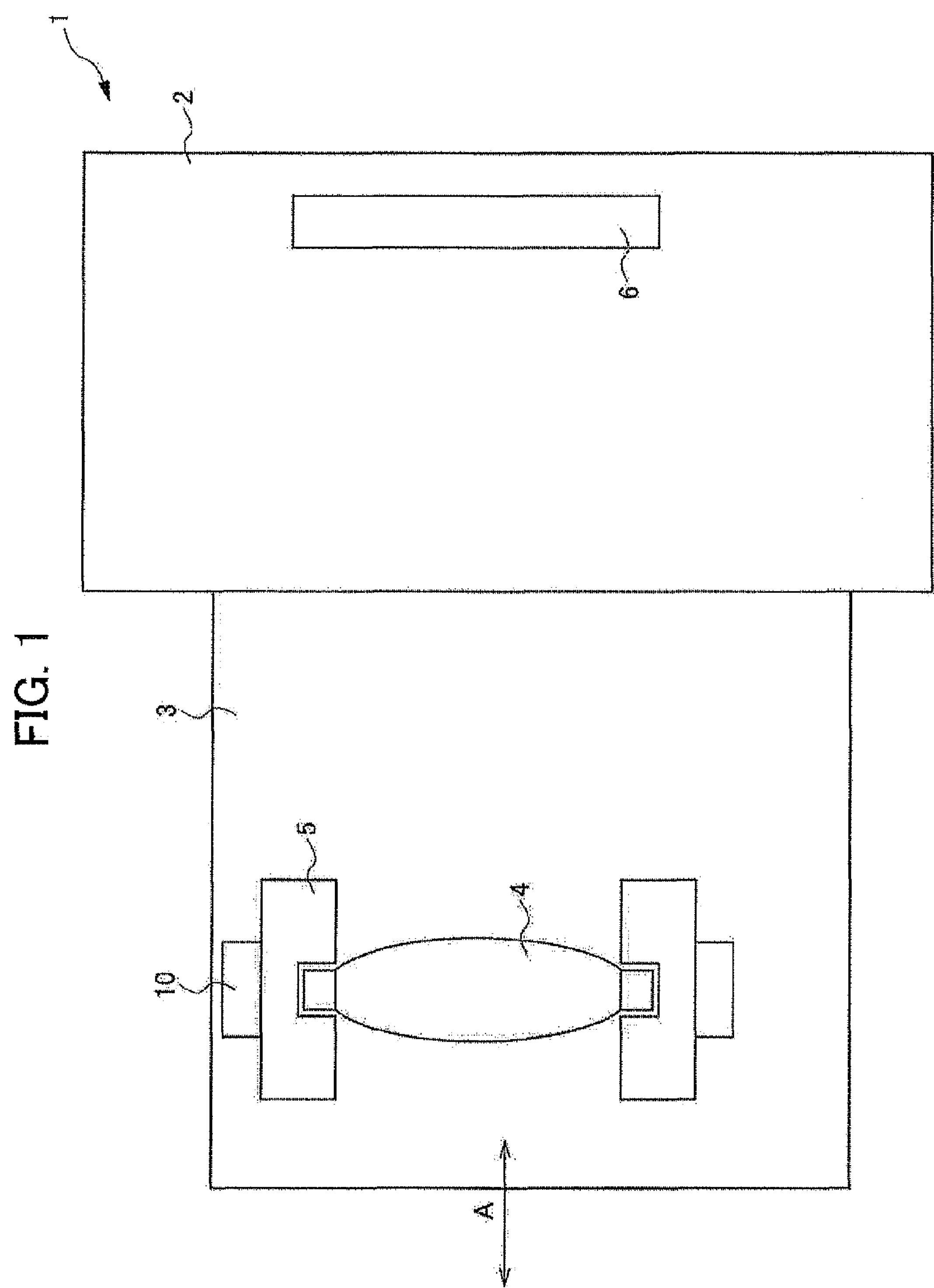
FIG. 1 is a figure illustrating a camera having an ultrasonic motor according to an embodiment of the present invention.

1: camera
10: ultrasonic motor
11: vibrating element
12: elastic body
13: piezoelectric body
14: moving body
18: pressure member

18*a*: pressure plate (permanent magnet)
18*b*: spring member
18*c*: spring plate (magnetic material)

PREFERRED MODE FOR CARRYING OUT THE INVENTION

An embodiment of the present embodiment is explained hereinafter with reference to the drawings. It should be noted that the following embodiment is described by employing an ultrasonic motor 10 using vibration in the ultrasonic range as a vibration actuator.

FIG. 1 is a diagram illustrating a camera 1 having an ultrasonic motor 10 according to the present embodiment. The camera 1 is provided with a camera body 2 having an imaging element 6, and a lens barrel 3. The lens barrel 3 is an interchangeable lens that can be detached from the camera body 2. It should be noted that, although the present embodiment shows an example in which the camera 1 has the lens barrel 3 that is an interchangeable lens, the present invention is not limited thereto and, for example, the lens barrel 3 may be a lens barrel that is integrated with the camera body.

The lens barrel 3 is provided with a lens 4, a cam barrel 5, an ultrasonic motor 10, and the like. The ultrasonic motor 10 is a substantially circular shape and is disposed in the lens barrel 3 so that a direction of the circular central axis thereof substantially matches a direction of the optical axis (direction of the arrow A of FIG. 1). This ultrasonic motor 10 is employed as a drive source that drives the lens 4 during focusing operations of the camera 1. The drive force obtained from the ultrasonic motor 10 is transferred to the cam barrel 5. The lens 4 is cam-engaged with the cam barrel 5 and, when the cam barrel 5 is rotated by the drive force of the ultrasonic motor 10, the lens 4 moves toward the direction of the optical axis by way of the cam engagement to perform focusing.

Figure 2:
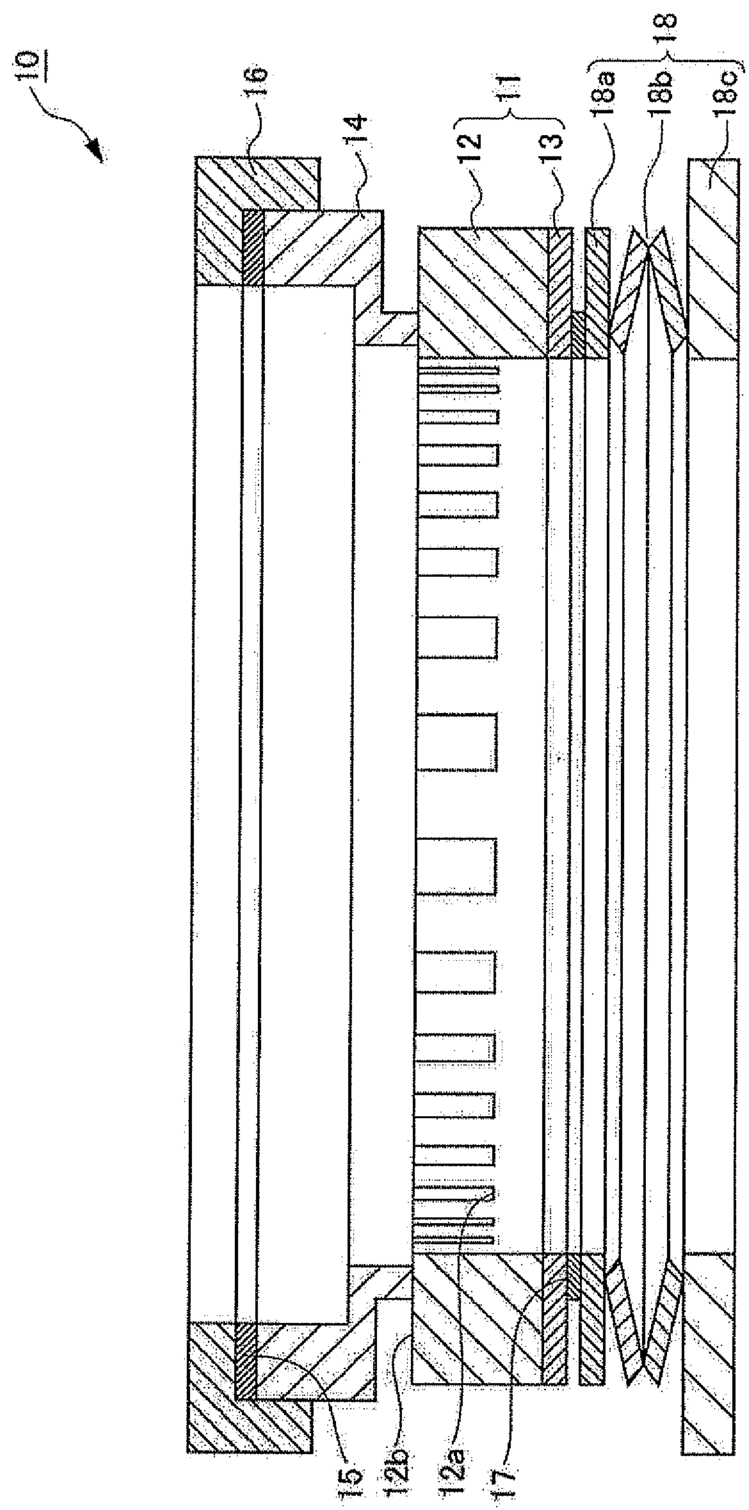
FIG. 2 shows a cross section of the ultrasonic motor in a direction of a circular central axis of the ultrasonic motor.

FIG. 2 shows a cross section of the ultrasonic motor 10 in a direction of a circular central axis thereof. The ultrasonic motor 10 is provided with a vibrating element 11, a moving body 14, a shock-absorbing member 15, a support member 16, a shock-absorbing member 17, and a pressure member 18.

The vibrating element 11 is a substantially circular shape and is provided with an elastic body 12 and a piezoelectric body 13. The elastic body 12 is a substantially circular shaped member that is formed using a metal material that can be deformed elastically such as an iron alloy such as stainless steel materials and Invar materials, and brass. The piezoelectric body 13 is provided at one end face of the elastic body 12. A comb tooth portion 12*b* formed by cutting out a plurality of grooves 12*a* is formed in the other end face of the piezoelectric body 13. A progressive wave is generated at the tip surface of the comb tooth portion 12*b* by the excitation of the piezoelectric body 13, a result of which the tip surface thereof becomes a drive surface that drives the moving body 14.

The piezoelectric body 13 is an electromechanical conversion element that converts electrical energy to mechanical energy. In the present embodiment, the piezoelectric body 13 is formed using PZT (piezoelectric zirconate titanate) and is coupled with the elastic body 12 using an electrically conductive adhesive or the like. An electrode (not illustrated) that is electrically connected with a flexible printed substrate (not illustrated) is formed on the piezoelectric body 13. The piezoelectric body 13 is excited by the drive signal supplied from this flexible printed substrate.

The moving body 14 is a substantially circular shaped member, and is brought into pressurized contact with the drive surface of the elastic body 12 with the pressure of the pressure member 18 (described later) and is friction driven by the progressive wave of the elastic body 12. The shock-absorbing member 15 is a substantially circular shaped member formed using rubber or the like. This shock-absorbing member 15 is a member made so that vibration of the moving body 14 is not transferred to the support body 16, and is provided between the moving body 14 and the support body 16. The support body 16 is a member that supports the moving body 14. The support body 16 is integrally rotated with the moving body 14 to transfer the rotation movement of the moving body 14 to a driven member (not illustrated), and regulates the position of the moving body 14 in the direction of a rotational central axis. The shock-absorbing member 17 is a substantially circular shaped member that is formed using nonwoven fabric, felt, or the like. This shock-absorbing member 17 is a member made so that vibration of the vibrating element 11 is not transferred to the pressure member 18, and is provided between the piezoelectric body 13 and the pressure member 18.

The pressure member 18 is a member that is composed of an elastic member such as a spring and generates a pressurizing force to bring the vibrating element 11 into pressurized contact with the moving body 14. The pressure member 18 is provided with a spring member 18*b* and a pressure plate 18*a* and a retainer plate 18*c* sandwiching the spring member 18*b*. A disc spring washer is used for the spring member 18*b* in the present embodiment. However, the spring member 18*b* is not limited to the disc spring washer and, so far as it can be extended in the vertical direction of the drawings, it may be a circular member that is formed in a wave shape along a circumference thereof, for example.

The pressure plate 18*a* is a substantially circular plate-shaped member made of a permanent magnet. It should be noted that, although the material of the permanent magnet is not limited to the following, it may be ferrite magnet, samarium-cobalt magnet, neodymium magnet, alnico magnet, or the like. The retainer plate 18*c* is a substantially circular plate-shaped member made of a magnetic material and has a function of fixing the ultrasonic motor 10 to the lens barrel 3. It should be noted that magnetic material refers to a material that can take on a magnetic property.

Since the pressure plate 18*a* is made of a permanent magnet and the retainer plate 18*c* is made of a magnetic material in this way, a magnetic force is generated between the pressure plate 18*a* and the retainer plate 18*c*. The amplitude of this magnetic force changes depending on ambient temperature, and the an amount of change M in the magnetic force of the permanent magnet due to temperature change is represented by the following formula.

$$M \times \alpha \times \Delta t = \Delta M$$

Here, M is the magnetic force of the permanent magnet at ordinary temperature, $\alpha$ is the temperature coefficient (%) of the permanent magnet, and $\Delta t$ is the difference between the ordinary temperature and actual temperature.

The temperature coefficient $\alpha$ is −0.18 for a ferrite magnet, −0.03 for a samarium-cobalt magnet, −0.12 for a neodymium magnet, and −0.02 for an alnico magnet. Since these temperature coefficients are negative, the magnetic force between the pressure plate 18*a* and the retainer plate 18*c* is strengthened when the temperature drops and is weakened when the temperature rises.

Figure 3A:
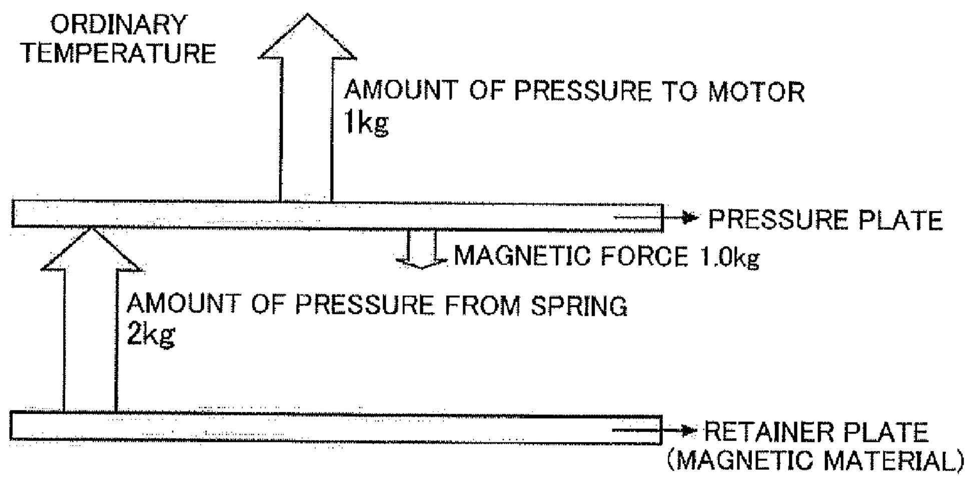
FIG. 3A shows power relationships of a pressure member during period at ordinary temperature.
Figure 3B:
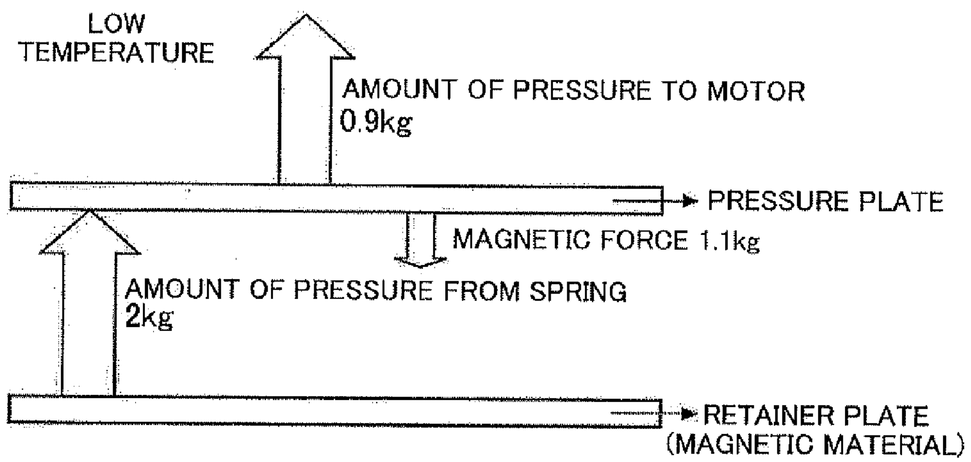
FIG. 3B shows power relationships of a pressure member during period at ordinary temperature at low temperature.
Figure 3C:
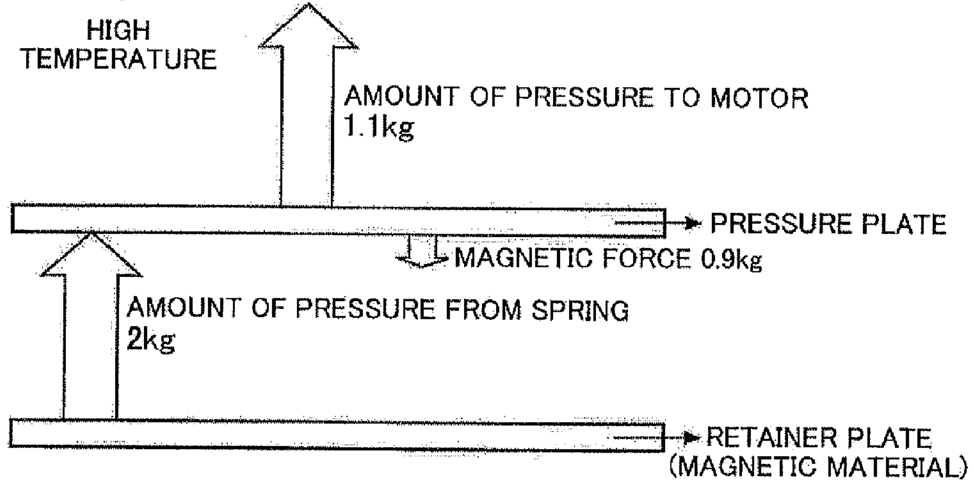
FIG. 3C shows power relationships of a pressure member during period at ordinary temperature at high temperature.

FIG. 3A shows power relationship of a pressure member during periods at ordinary temperature; FIG. 3B shows power relationship of a pressure member during periods at ordinary temperature at low temperature; and FIG. 3C shows power relationship of a pressure member during periods at ordinary temperature at high temperature. For example, the amount of pressurizing force generated by the spring member 18*b* pushing the vibrating element 11 toward the moving body 14 is set to be 2.0 kg. This amount of pressurizing force does not change during periods at 3A ordinary temperature, 3B low temperature, or 3C high temperature. In addition, the magnetic force between the pressure plate 18*a* and the retainer plate 18*c* is set to be 1.0 kg. As a result, the force of the pressure plate 18*a* pushing the vibrating element 11 toward the moving body 14 at ordinary temperature is 1.0 kg, which is obtained by subtracting 1.0 kg from 2.0 kg, as shown in FIG. 3A.

Since the magnetic force between the pressure plate 18*a* and the retainer plate 18*c* at low temperature becomes greater than that at ordinary temperature, it is 1.1 kg, for example. Consequently, the force of the pressure plate 18*a* pushing the vibrating element 11 toward the moving body 14 becomes 0.9 kg, which is obtained by subtracting 1.1 kg from 2.0 kg, as shown in FIG. 3B. That is, the force thereof at low temperature becomes smaller than that at ordinary temperature.

Since the magnetic force between the pressure plate 18*a* and the retainer plate 18*c* at high temperature becomes smaller than that at ordinary temperature, it is 0.9 kg, for example. As a result, the force of the pressure plate 18*a* pushing the vibrating element 11 toward the moving body 14 becomes 1.1 kg, which is obtained by subtracting 0.9 kg from 2.0 kg, as shown in FIG. 3C. That is, the force thereof at high temperature becomes greater than that at ordinary temperature.

Furthermore, the drive characteristics of the ultrasonic motor 10 change depending on temperature change of the environment for use. This is because, from a temperature change, the contact surface of the elastic body 12 with the piezoelectric body 13 deforms due to the difference in the thermal expansion coefficients between the elastic body 12 and the piezoelectric body 13, a frictional coefficient of the frictional contact surface between the vibrating element 11 and the moving body 14 changes, or the capacitance of the piezoelectric body 13 changes by the humidity of the air changing under the environment for use.

For example, in a case in which the ultrasonic motor 10 is placed in a low temperature environment, the capacitance of the piezoelectric body 13 becomes smaller, and the force of the progressive wave generated by the vibrating element 11 driving the moving body 14 decreases. Consequently, the drive force generated by the ultrasonic motor 10 becomes smaller. Furthermore, under the low temperature environment, since the amount of moisture in the air decreases, the frictional coefficient of the frictional contact surface between the vibrating element 11 and the moving body 14 increases. Due to such relationships, the ultrasonic motor 10 tends to have start-up characteristics, drive characteristics at low speed, and the like that are inferior under a low temperature environment compared to those under an ordinary temperature environment.

However, in the present embodiment, the pressurizing force of the pressure plate 18*a* pushing the vibrating element 11 toward the moving body 14 decreases under the low temperature environment as described above. Since the pressurizing force decreases, the force pushing the moving body 14 decreases and it becomes easy for the moving body 14 to rotate compared to the case under the ordinary temperature environment. Therefore, it is possible to compensate for the decrease of the abovementioned drive force due to a temperature drop, and to reduce the change in the drive characteristics relative to during ordinary temperature.

On the other hand, in a case in which the ultrasonic motor 10 is disposed in a high temperature environment, the capacitance of the piezoelectric body 13 becomes greater and the force of the progressive wave generated by the vibrating element 11 driving the moving body 14 increases. As a result, the number of rotations of the moving body 14 increases and the drive force generated by the ultrasonic motor 10 becomes greater. In addition, the contact surface of the elastic body 12 and the piezoelectric body 13 deforms, and driving of the moving body 14 becomes prone to instability. Therefore, the ultrasonic motor 10 tends to easily generate noise due to vibrations of the moving body 14 under a high temperature environment, compared to the ordinary temperature environment.

However, in the present embodiment, as described above, the pressurizing force generated by the entire pressure member 18 increases under the high temperature environment. Since the pressurizing force increases, the force pressing the moving body 14 increases, and it becomes difficult for the moving body 14 to rotate compared to the case of the ordinary temperature environment. Therefore, it is possible to suppress an increase in the number of rotations accompanying a temperature rise, and to reduce noise generation.

According to the present embodiments, the following effects are obtained.

(1) According to the present embodiment as described above, it is possible to compensate for a decrease in the drive force of the ultrasonic motor 10 under the low temperature environment, and to reduce the change in the drive characteristics of the ultrasonic motor 10 relative to during ordinary temperature. In addition, it is possible to mitigate the rise in the number of rotations under the high temperature environment, and to reduce noise generation. In this way, it is possible to obtain stable driving regardless of a change in the temperature of the ultrasonic motor 10.

(2) According to the present embodiment, adjustment of the force of the vibrating element 11 pressing the moving body 14 can be achieved by a simple configuration in which the pressure plate 18*a* is produced using a permanent magnet and the retainer plate 18*c* is produced using a magnetic material. Accordingly, it is also possible to facilitate production and reduce production cost.

Modified Embodiments

The present invention is not limited to the embodiment explained above, and various modification and changes such as those shown below are possible and are also within the scope of the present invention.

(1) In the present embodiment, the permanent magnet (the pressure plate 18*a*) is disposed at a vibrating element 11 side of the spring member 18*b* and the magnetic material (the retainer plate 18*c*) is disposed at an opposite side of the spring member 18*b*. However, the present invention is not limited thereto. The magnetic material (the retainer plate 18*c*) may be disposed at a vibrating element 11 side of the spring member 18*b* and the permanent magnet (the pressure plate 18*a*) may be disposed at an opposite side of the spring member 18*b*.

(2) In the present embodiment, an example is shown in which the ultrasonic motor 10 is disposed in the lens barrel 3 so that a direction of the circular central axis thereof substantially matches the direction of the optical axis. However, the present invention is not limited thereto. For example, for a case of a small ultrasonic motor 10, the optical axis of the lens barrel 3 and the central axis of the ultrasonic motor 10 may be disposed so as not to match each other.

(3) In the present embodiment, an example is explained in which the vibration actuator is provided as the ultrasonic motor 10 in which the moving body 14 is rotationally driven. However, the present invention is not limited thereto. For example, a linear-type vibration actuator may be utilized in which the moving body 14 is driven in a linear direction. In addition, vibration actuators of rod-type, a pencil-type, a disc-type or the like may be utilized.

(4) In the present embodiment, although an example is explained in which the vibration actuator is provided as the ultrasonic motor 10 that uses vibration in the ultrasonic range, the present invention is not limited thereto. For example, a vibration actuator employing vibration other than the ultrasonic range may be used.

(5) In the present embodiment, an example is explained in which the ultrasonic motor 10 is used as the drive source of the lens 4 during focusing operations of the camera 1. However, the present invention is not limited thereto. For example, it may be used as a drive source during zooming operations of the camera 1. In addition, it may be used as a drive source for a blur-correcting mechanism that corrects blurring caused by hand motion by way of driving a part of the imaging system of the camera 1. It may be used for a drive unit of a copy machine, a drive unit of a steering-wheel tilt device for a vehicle or of a head rest, a drive unit for a timepiece, and the like. It should be noted that, although the embodiment and the modified embodiments can be combined as appropriate, the detailed explanations are omitted. In addition, the present invention is not limited by the above-described embodiments.

The invention claimed is:

1. A vibration actuator comprising:

a vibrating member;

a relatively moving member configured to move relative to the vibrating member;

a pressure member configured to apply a pressing force to the vibrating member to cause the vibrating member to be in pressure contact with the relatively moving member; and a magnetic force generating unit configured to adjust the pressing force of the pressure member according to a variable amount of magnetic force according to an ambient temperature; wherein the pressure member includes an elastic member that presses the vibrating member toward the relatively moving member, and the magnetic force generating unit causes a magnetic force to be generated in a direction suppressing pressure imparted by the elastic member.

2. The vibration actuator according to claim 1, wherein the magnetic force generating unit includes a magnetic material and a magnet, and the elastic member is disposed between the magnetic material and the magnet.

3. The vibration actuator according to claim 2, wherein the magnet is a permanent magnet.

4. The vibration actuator according to claim 2, wherein the magnetic material is disposed on one side of the magnet and the vibrating member is disposed on another side of the magnet.

5. The vibration actuator according to claim 4, wherein the magnet is disposed on one side of the vibrating member and the relatively moving member is disposed on another side of the vibrating member.

6. The vibration actuator according to claim 1, wherein the vibrating member includes an electromechanical conversion element that converts electrical energy into mechanical energy and an elastic body that generates the vibration by excitation of the electromechanical conversion element, and the relatively moving member is disposed on one side of the elastic body and the electromechanical conversion element is disposed on another side of the elastic body.

7. A lens barrel provided with the vibration actuator according to claim 1.

8. A camera provided with the vibration actuator according to claim 1.

9. The vibration actuator according to claim 1, wherein the variable magnetic force is configured to cause the pressing force of the pressure member to change such that the lower the ambient temperature, the smaller an amount of the pressing force of the pressure member, and the higher the ambient temperature, the greater the amount of the pressing force of the pressure member.

* * * * *